United States Patent
Suprapmo et al.

(10) Patent No.: US 7,164,576 B2
(45) Date of Patent: Jan. 16, 2007

(54) MULTIMEDIA SPEAKER WITH INTEGRATED STAND

(75) Inventors: Susimin Suprapmo, Singapore (SG); Aik Hee Goh, Singapore (SG); Chiew Foon Celia Wong, Singapore (SG); Hua Chung Ho, Singapore (SG)

(73) Assignee: Creative Technology Ltd, Singapore (SG)

( * ) Notice: Subject to any disclaimer, the term of this patent is extended or adjusted under 35 U.S.C. 154(b) by 292 days.

(21) Appl. No.: 10/841,199

(22) Filed: May 6, 2004

(65) Prior Publication Data

US 2005/0248911 A1    Nov. 10, 2005

(51) Int. Cl.
*H05K 5/00* (2006.01)
*G06F 1/16* (2006.01)
*H04R 25/00* (2006.01)

(52) U.S. Cl. .................... 361/683; 381/388; 248/918

(58) Field of Classification Search ........ 361/679–683, 361/686, 724–727; 381/87, 88, 385–388; 345/169, 905; 248/917–924
See application file for complete search history.

(56) References Cited

U.S. PATENT DOCUMENTS

| | | | | |
|---|---|---|---|---|
| 5,321,760 A * | 6/1994 | Gray | ............................ | 381/86 |
| 5,604,663 A | 2/1997 | Shin et al. | | |
| 5,768,163 A * | 6/1998 | Smith, II | ..................... | 708/105 |
| 5,812,369 A | 9/1998 | Hsu et al. | | |
| 5,825,614 A * | 10/1998 | Kim | ............................ | 361/683 |
| 5,838,537 A * | 11/1998 | Lundgren et al. | ............ | 361/683 |
| 5,880,928 A * | 3/1999 | Ma | .............................. | 361/683 |
| 6,040,978 A | 3/2000 | Spencer | | |
| 6,043,976 A * | 3/2000 | Su | ............................... | 361/686 |
| 6,078,497 A * | 6/2000 | Derocher et al. | ........... | 361/683 |
| 6,151,401 A * | 11/2000 | Annaratone | .................. | 381/388 |
| 6,181,550 B1 | 1/2001 | Kim | | |
| 6,191,942 B1 * | 2/2001 | Lee et al. | ..................... | 361/683 |
| 6,243,260 B1 * | 6/2001 | Lundgren et al. | ............ | 361/683 |
| 6,292,358 B1 * | 9/2001 | Lee et al. | ..................... | 361/683 |
| 6,304,435 B1 | 10/2001 | Hsu | | |
| 6,343,135 B1 * | 1/2002 | Ellero et al. | ................. | 381/387 |
| 6,600,827 B1 * | 7/2003 | Lu | ............................... | 381/388 |
| 6,663,066 B1 | 12/2003 | Hong | | |
| 6,812,958 B1 * | 11/2004 | Silvester | ................... | 348/207.1 |
| 2001/0012197 A1 * | 8/2001 | O'Neal et al. | ............... | 361/683 |
| 2004/0060152 A1 * | 4/2004 | Kim | ............................ | 16/322 |
| 2005/0069159 A1 * | 3/2005 | Nakazato | ..................... | 381/306 |

FOREIGN PATENT DOCUMENTS

EP    1091068 A2 *    4/2001

\* cited by examiner

*Primary Examiner*—Anatoly Vortman
(74) *Attorney, Agent, or Firm*—Russell N. Swerdon

(57) ABSTRACT

A portable speaker system for use with a laptop computer is configured for attachment to a screen of a laptop computer or alternatively for a free standing configuration. The speaker system includes an acoustic chamber for containment of the sound reproducing mechanism, a second chamber, and a damped hinge mechanism for movable connecting the acoustic chamber and the second chamber.

18 Claims, 5 Drawing Sheets

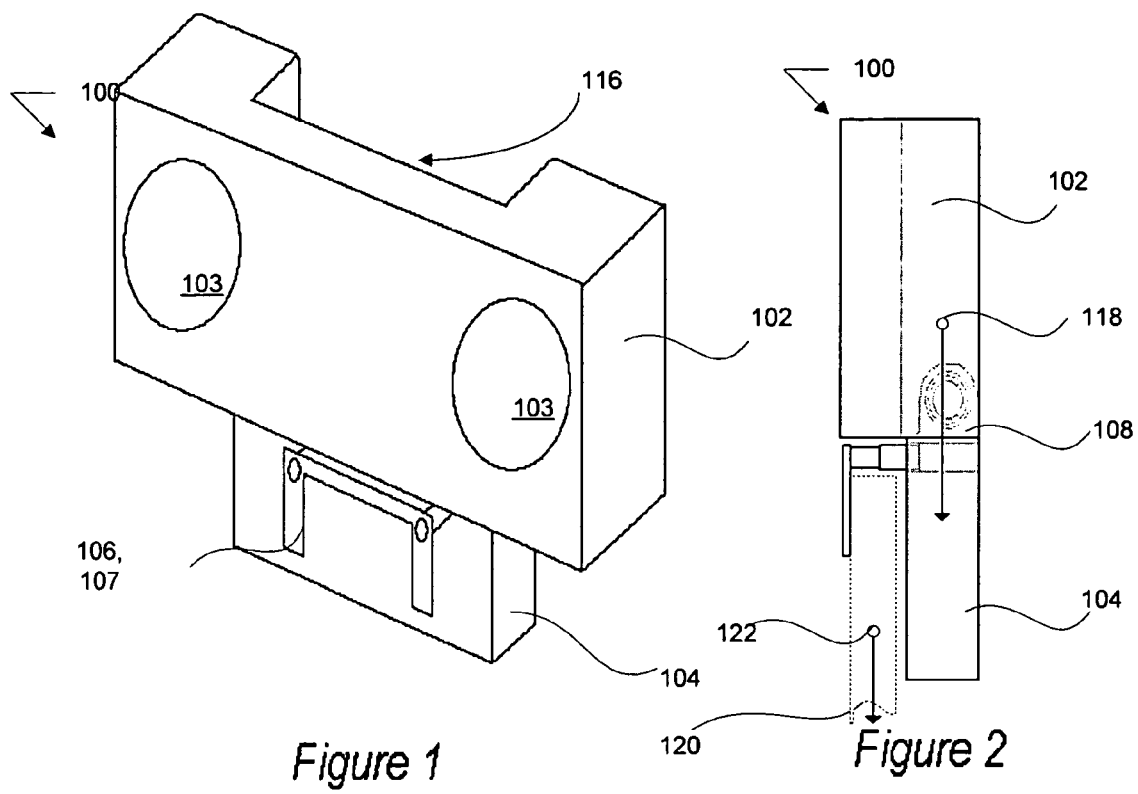
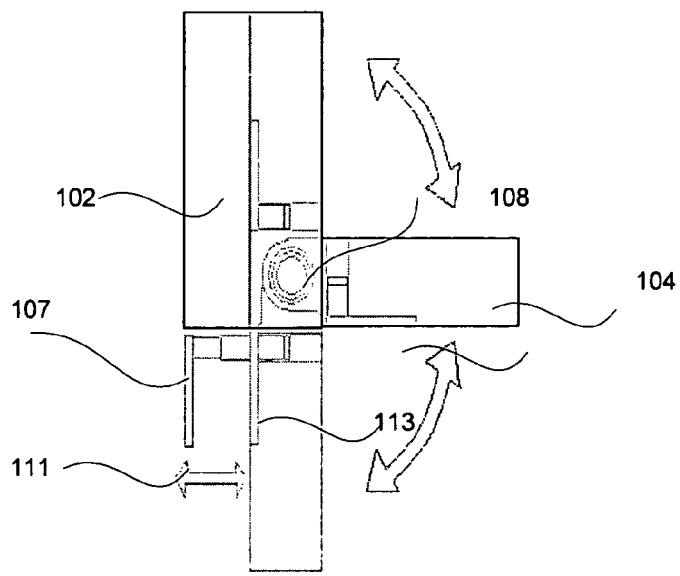
Figure 1
Figure 2
Figure 3

MULTIMEDIA SPEAKER WITH INTEGRATED STAND

BACKGROUND OF THE INVENTION

1. Field of the Invention

The present invention relates to portable speaker enclosures. More particularly, the present invention relates to portable speakers and devices for mounting those speakers on portable computers.

2. Description of the Related Art

The personal computer market has grown rapidly in the past decade. Recent trends have focussed in the improvement of overall sound quality as well as the portability of computers. Laptop computers, i.e., portable computers, over time represent a growing proportion of overall computer sales. To provide a multimedia effect, speakers are commonly incorporated into the bodies of the laptop computer, sometimes as a single sound reproduction unit and sometimes providing two or more sound reproduction units to achieve an overall stereophonic effect. Often, the speakers built into the unit are positioned at a selected spacing to enhance the stereophonic effect. However, the sizes of the laptop computer cavities have decreased as consumers have demanded smaller and lighter portable computers. Hence, the available space for positioning the speakers as well as the size constraints on the speakers themselves has placed greater restrictions on the design of laptop audio systems.

To overcome these constraints, one technique includes providing portable speakers with built in clamps for attaching the speakers to the laptop computer screen. These systems depend heavily on spring loaded grips for attaching the speakers to the laptop monitor. One mounting option places the speaker and clamp combination at the top of the computer's LCD display, resulting in the center of gravity of the speaker including clamp lying significantly above the clamping position at the upper flange of the display unit. Unfortunately, the size of the speaker and clamp combination often results in the center of gravity of the combination lying outside the footprint of the clamp and outside the respective center of gravity of the laptop screen. This known technique thus relies solely on the clamping force to secure the speaker to the display unit, without the benefit of natural stability.

The heavy reliance on clamping force creates reliability problems as well. The spring force impinging on the LCD panel flange is proportional to the extension of the spring by Hooke's law. Used at minimum extension to attach speakers to thin flanged display units, the spring would have to be stiff to provide adequate clamping force. On the other hand, when such a stiffly sprung clamp is used at maximum extension to accommodate thick monitor flanges, the spring force could become excessive, possibly causing damage to the clamp or display unit.

The mechanical instability is aggravated when the laptop display screen is tilted backwards from a vertical plane for viewing. Here, the center of gravity for the speaker/clamp assembly lies outside of the footprint of the laptop. Moreover, the speaker/clamp assembly sets up significant amounts of vibration in the display unit, adding undesirable coloration to the sound. These vibrations may also compromise product reliability. Finally, the clamp mechanism in the known mechanism is external to the speaker, and is inconvenient for the target consumer groups: people who require compact portable speaker solutions on the go.

Accordingly, what is needed is an improved portable speaker system that overcomes these problems. In particular, it is desirable to provide a compact portable speaker system that can be easily and securely attached to a wide range of computer display panels.

SUMMARY OF THE INVENTION

To achieve the foregoing, the present invention provides a portable speaker system for use with a portable computer. The portable speaker system includes a multi function compact speaker that is suitable for portable use, for use as a home speaker with integral stand, or as a flat panel display mountable speaker. The portable speaker system includes an acoustic member, preferably a chamber, in which a single speaker driver or group of speaker drivers is housed. The acoustic chamber could be either sealed or vented, and is movably attached to a second member or chamber by a hinge. The second member in one alternative embodiment is a chamber used to house part of or all of the electronics required, and is rotatable about its hinge relative to the first acoustic chamber.

The action of the hinge preferably provides convenient adjustment, while providing resistance to inadvertent movements due to the vibrations induced by the speakers, or under the influence of the weight of the acoustic chamber. The hinge is also damped and compliant within an appropriate range of movement, such as those induced by the speakers in the acoustic chamber. The compliance and damping serves as an effective means of isolating and decoupling the vibrations caused by the operation of the speakers. An extendable arm is movably attached to the base of the second chamber to provide a reliable means of attaching the speaker system to a flat panel display unit. The arm is designed to be retractable into the body of the second chamber, and is held in its position by means of a suitable mechanical compliance, by friction, or by a clutch mechanism built into the interface of the arm and the second chamber.

According to one embodiment, a portable speaker system capable of attachment to a portable computer is provided. The system includes an acoustic member having a sound reproducing mechanism, a second member configured for coupling to the portable computer, and a damped hinge mechanism movably coupling the acoustic member and the second member. The damped hinge mechanism in another embodiment comprises at least a first and second rotating ring configured to provide rotational movement therebetween and at least one elastic ring positioned between the two rings. The diameter and thickness is selected in one embodiment to provide damping in a range suitable for decoupling acoustic induced vibrations from the sound reproducing mechanism to the second member.

According to another embodiment, the system further comprises an extendable arm coupled to the second member and configured for removably coupling the second member to the computer. The extendable arm is configured for retraction in a first mode for retraction into the second member and in a second mode for extension for coupling to the computer.

These and other features and advantages of the present invention are described below with reference to the drawings.

BRIEF DESCRIPTION OF THE DRAWINGS

FIG. 1 is a perspective view illustrating a portable speaker system in accordance with one embodiment of the present invention.

FIG. 2 is a side elevation view illustrating the portable speaker system of FIG. 1 in accordance with one embodiment of the present invention.

FIG. 3 is a second side elevation view illustrating the portable speaker system of FIG. 1 in accordance with one embodiment of the present invention.

DETAILED DESCRIPTION OF PREFERRED EMBODIMENTS

Figure 4:
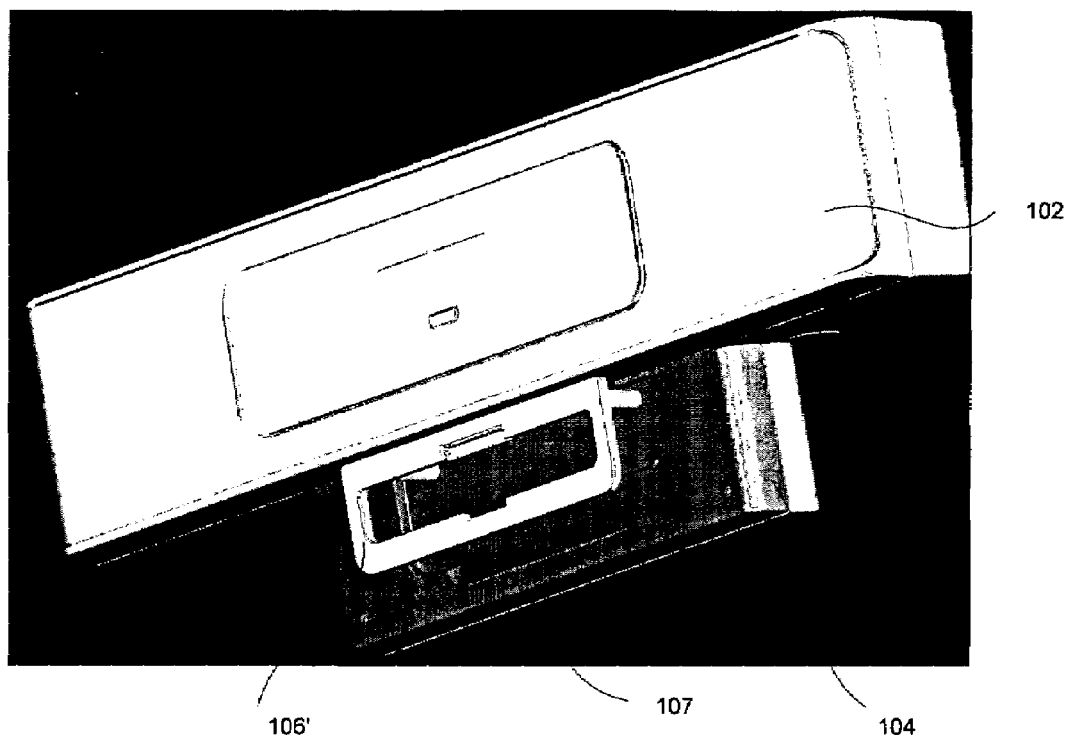
FIG. 4 is a perspective view illustrating a portable speaker system in accordance with one embodiment of the present invention.

Reference will now be made in detail to preferred embodiments of the invention. Examples of the preferred embodiments are illustrated in the accompanying drawings. While the invention will be described in conjunction with these preferred embodiments, it will be understood that it is not intended to limit the invention to such preferred embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The portable speaker system in accordance with several embodiments includes a multi function compact speaker that is suitable for portable use, for use as a home speaker with integral stand, or as a flat panel display mountable speaker. The portable speaker system includes an acoustic member, preferably a chamber, in which a single speaker driver or group of speaker drivers or other sound reproduction devices are housed. The acoustic chamber could be either sealed or vented, and is movably attached to a second member chamber by a hinge. The second member in one alternative embodiment is a chamber used to house part of or all of the electronics required, and is rotatable about its hinge relative to the first acoustic chamber.

FIG. 1 is a perspective view illustrating a portable speaker system in accordance with one embodiment of the present invention. FIG. 2 is a side elevation view and FIG. 3 is a second side elevation view illustrating the portable speaker system of FIG. 1 in accordance with one embodiment of the present invention. Throughout this description like reference numbers are used to refer to like elements. The portable speaker system 100 in accordance with an embodiment of the present invention preferably includes an acoustic member 102 for securing one or more speakers 103, a second member 104 connected by a hinge 108, and an extendable arm 106 for securing the assembly 100 to a portable computer (not shown). Preferably the first member is an acoustic chamber, suitable for enclosing one or a plurality of speakers to provide the listener with an enhanced multimedia experience. The acoustic chamber could be either sealed or vented, in accordance with design preference. The acoustic chamber is coupled with the second member by a hinge mechanism 108. Preferably, the hinge mechanism is configured such that the acoustic chamber 102 may be adjustably rotated about the axis of the hinge, thereby providing convenient adjustment for the directionality of sound generated by the speakers 103. That is, the acoustic chamber 102 may be adjusted to suit the listening preferences of the user and thereby avoiding the directional constraints of a portable computer's display screen panel. In other words, the hinge mechanism allows the user to adjust the speakers independently of the portable computer display screen.

Actual coupling of the system to the display screen is provided by an extendable arm 106. One embodiment uses a telescopic extendable arm which is configured for positioning in two modes. In a retracted mode, shown at position 113 in FIG. 3, the extendable arm is positioned against the second member (enclosure) or alternatively, compactly folded up in a recess formed in the second chamber 104. For ease of illustration, the length of the second member 104 is shown to be substantially less than that of the acoustic chamber 102. It is to be appreciated that these relative dimensions are provided for illustration purposes only and are not intended to be limiting. In accordance with other embodiments the relative lengths of the described members may be the same or according to yet another alternative embodiment, the acoustic chamber may be shorter in length than the second chamber.

It is to be further appreciated that portable computer display screens often present a very small frame surrounding the LCD screen (i.e., the display portion of the laptop lid) on the front face of the portable computer lid. Accordingly, it is preferred that a mounting plate 107 of the extendable arm 106 be constructed so as to minimize or eliminate any intrusion onto the LCD screen itself. For example, a mounting plate having a width of about 0.5 inch or less is expected to work well with common laptop screen sizes. As a further example, providing a mounting plate having a length of about two inches or more is expected to provide sufficient stability to the acoustic chamber after the system is mounted. These dimensions are intended to be illustrative and not limiting. It is to be further appreciated that the mounting plate 107, according to yet another embodiment, may have a length sufficient such that the two shown extensions of the mounting plate (i.e., the top and bottom f the "C" of the "C-shaped" mounting plate) are positioned one on each side of the front face of the display screen of the laptop computer.

For mounting purposes, the extendable arm 106 is preferably extended so that a clearance exists between the mounting plate and the front face of the second chamber for insertion of the laptop display screen, as shown in position 111 in FIG. 3.

Preferably the hinge mechanism 108 cooperates with the acoustic chamber 102 and the second chamber 104 to provide an adjustable range of motion. Preferably, the range of motion available is about 180 degrees. By using such a range, the second chamber 104 may be extended to be essentially coplanar with the acoustic chamber 102, as illustrated in FIGS. 1 and 2. In this configuration, the speaker system 100 may be mounted onto the laptop screen with the extendable arm extended for mounting onto the top portion of the display screen of the laptop. Alternatively, with the extendable arm retracted, the system may be placed flat against a horizontal or vertical surface, i.e., apart from the portable computer. In a second configuration, the acoustic chamber is adjusted so that a front plane of the second chamber 104 is positioned to be about 90 degrees relative to the corresponding front plane of the acoustic chamber 102. In this position, as illustrated in FIG. 3, the extendable arm is preferably retracted and the portable speaker system is supported by the second chamber, the latter acting as a support base. As further illustrated by the third outlined position of the second chamber in FIG. 3, the acoustic chamber may be adjusted so that the back face of the acoustic chamber lies directly against the corresponding back face of the second chamber, thereby providing a compact unit for travel. FIG. 3 further illustrates the second chamber 104 completely retracted or folded into the recess 116 formed in the back side of the acoustic chamber 102.

Using the configuration shown in the foregoing figures, it can be appreciated that the center of gravity of the invented system is relatively close to the center of gravity of the laptop screen upon which it is mounted. This reduces the moment arm created by the acoustic chamber and thus reduces the need for strong clamping forces on the relatively fragile LCD screens. Preferably, the center of gravity of the portable speaker system lies within about 0.5 inches of the center of gravity of the laptop screen when both are in a vertical orientation. FIG. 2 further illustrates an example center of gravity location 118 for the speaker system relative to the laptop screen 120 and its center of gravity 122.

FIG. 4 is a perspective view illustrating a portable speaker system in accordance with one embodiment of the present invention. Illustrated is a second chamber 104 (i.e., a base) opened to the 180 degree position relative to the acoustic chamber (i.e., the speakers) 102. The extendable arm 106' is shown with a variant "D-shaped" mounting plate 107', the extendable arm shown in the open or extended position.

Figure 5:
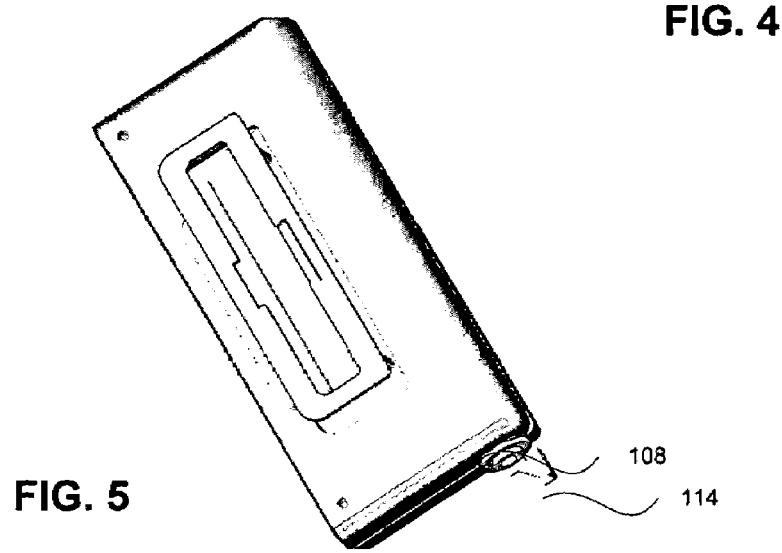
FIG. 5 is a perspective view illustrating a second member of a portable speaker system in accordance with one embodiment of the present invention.

FIG. 5 is a perspective view illustrating a second member of a portable speaker system in accordance with one embodiment of the present invention Shown is a metal hinge 108 for providing the relative movement between the acoustic chamber and the second chamber. Preferably, the hinge 108 is constructed so that the chambers may be tightly closed against each other. A flange 114 for attaching the hinge to the acoustic chamber is also shown.

Figure 6:
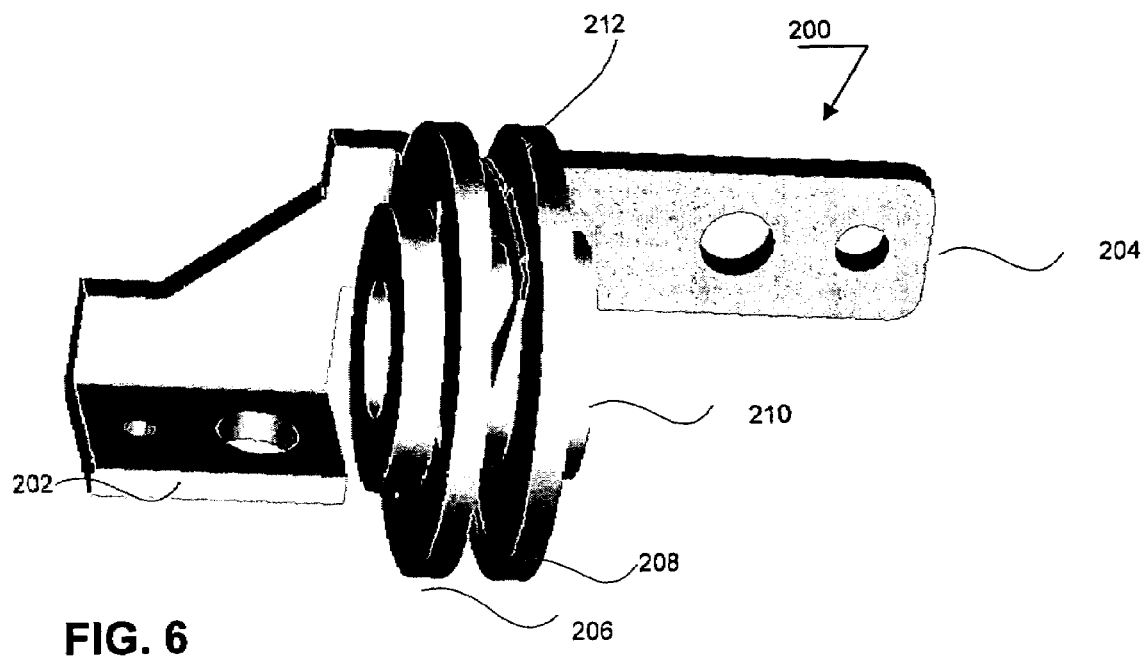
FIGS. 6 and 7 are perspective views of a metal hinge of a portable speaker system in accordance with one embodiment of the present invention.
Figure 7:
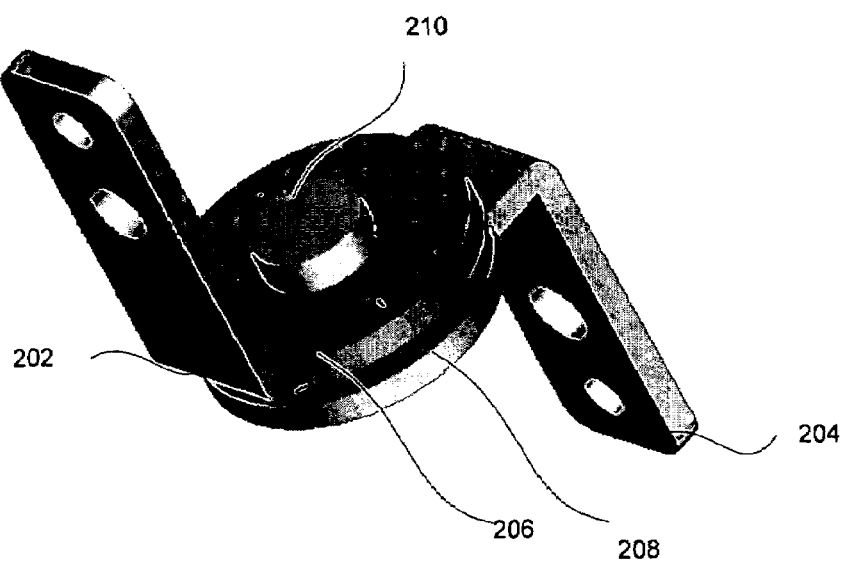

FIGS. 6 and 7 are perspective views of a metal hinge of a portable speaker system in accordance with one embodiment of the present invention. The hinge mechanism 200 preferably includes a first and second rotating ring 206, 208 respective ones of which are connected to the first flange 202 and second flange 204. A center core or pivot pin 210 is provided to enable the pivoting movement between the two flanges 202, 204. The flanges 202, 204 are respectively coupled with the acoustic chamber and second chamber by suitable fastening means known to those of skill in the relevant arts. Thus, relative movement between the chambers as described above with reference to FIGS. 1–3 can be provided. Preferably, the rotating rings and the center core are made from metal or suitable plastics as known to those of skill in the relevant arts.

Further illustrated in FIG. 6 is a spring washer 212 providing a frictional resistance force between the rotating rings 206 and 208. In a preferred embodiment, the spring washer 212 is replaced by an elastic washer or O-ring. By using such a washer having elastomeric properties, damping may be provided between the acoustic chamber and the second chamber. Further, sufficient compliance can be provide so that the acoustic chamber can be adjusted relative to the second chamber with the relative positions maintained after the adjustment is completed.

The above described damping provided by the interaction between the rotating rings and the washer eliminates or substantially reduces acoustic coloration induced by transmitted vibrations. Without suitable damping, vibrations caused by the speakers could be transmitted into the display unit, exciting sympathetic vibrations, which in turn reduces the sound quality. Preferably, at least one of the elastic ring composition, diameter and thickness is selected to provide damping in a range suitable for decoupling acoustic induced vibrations from the sound reproducing mechanism to the second member. By using the flexibility and damping properties of the flexible ring in the hinge mechanism, superior damping characteristics are obtained in comparison to that offered by thin elastic layers merely provided on the clamping surface, i.e., between a clamp and the computer screen.

Vibration is also a known cause of electronic equipment failure. Thus, many of the reliability concerns from conventionally attached speakers are eliminated by the hinge mechanism described. It should be appreciated that the scope of the present invention is not limited to a single hinge. Rather, any number of hinges can be employed to provide the desired characteristics, including sufficient damping and compliance. In one preferred embodiment, two damped hinge mechanisms are provided and symmetrically located on opposing ends of the second enclosure.

Figure 8:
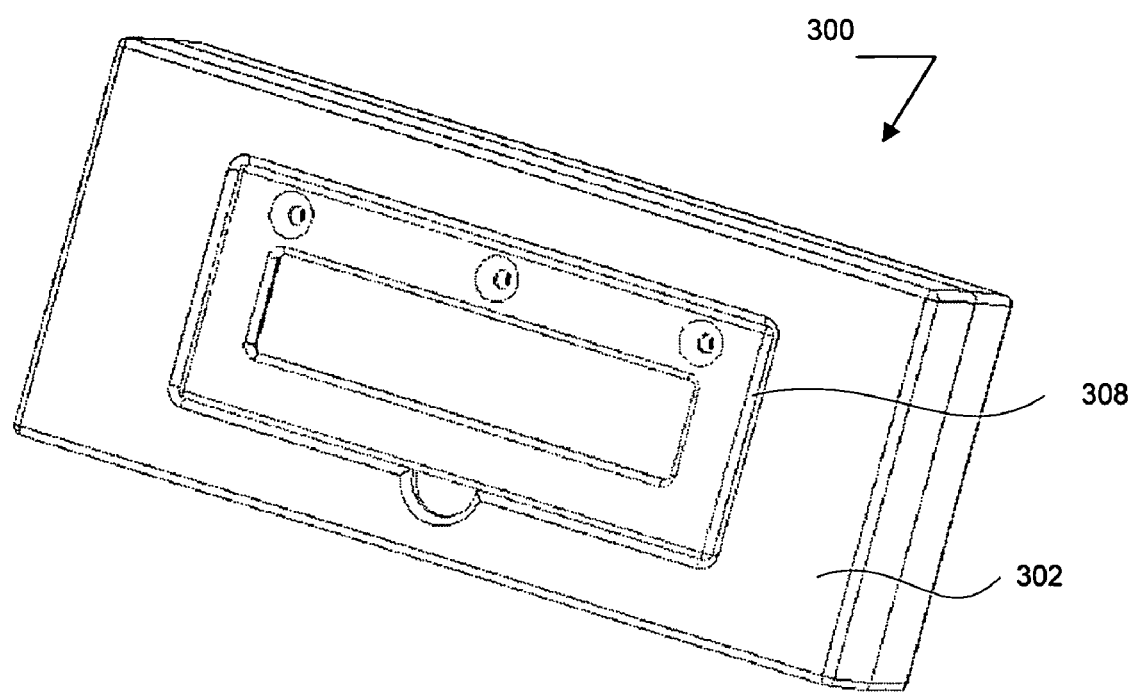
FIG. 8 is a perspective view of a telescopic extendable arm in a retracted position in accordance with one embodiment of the present invention.
Figure 9:
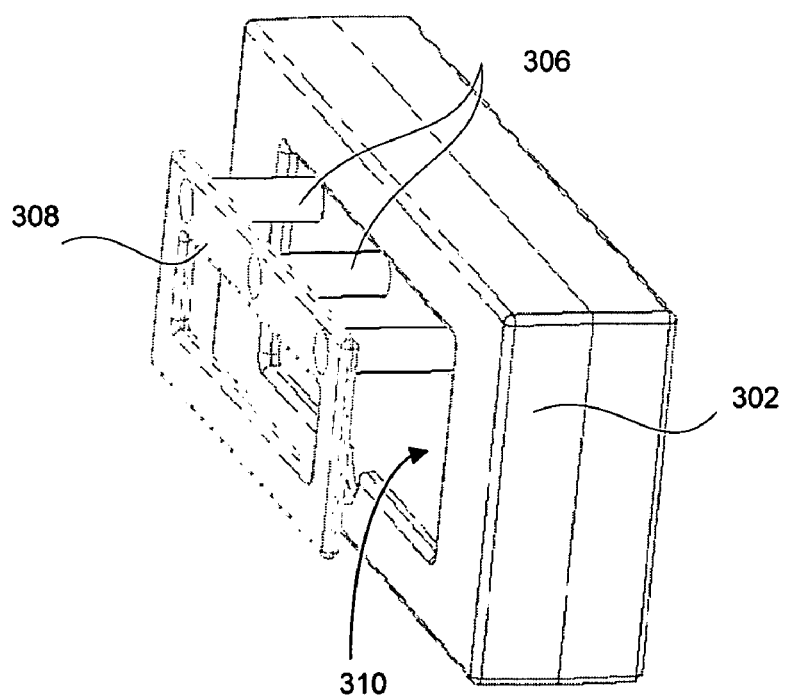
FIG. 9 is a perspective view of a telescopic extendable arm in an extended position in accordance with one embodiment of the present invention.

FIG. 8 is a perspective view of a telescopic extendable arm in a retracted position in accordance with one embodiment of the present invention. FIG. 9 is a perspective view of a telescopic extendable arm in an extended position in accordance with one embodiment of the present invention. In FIG. 8, the mounting plate 308 of the extendable arm is shown in a folded position. Preferably, when folded, the telescopic rods 306 of the extendable arm are concealed in the recess 310 formed in the second chamber 302. More preferably, the mounting plate 308 is also fully retractable into the recess 310. Preferably, the extendable arm of this configuration is spring loaded with suitable extension springs located within the hollow telescoping rods 306. As such, in a normal state, the mounting plate is retracted into the second chamber 302 through the return forces exerted by the spring to oppose extension.

Figure 10:
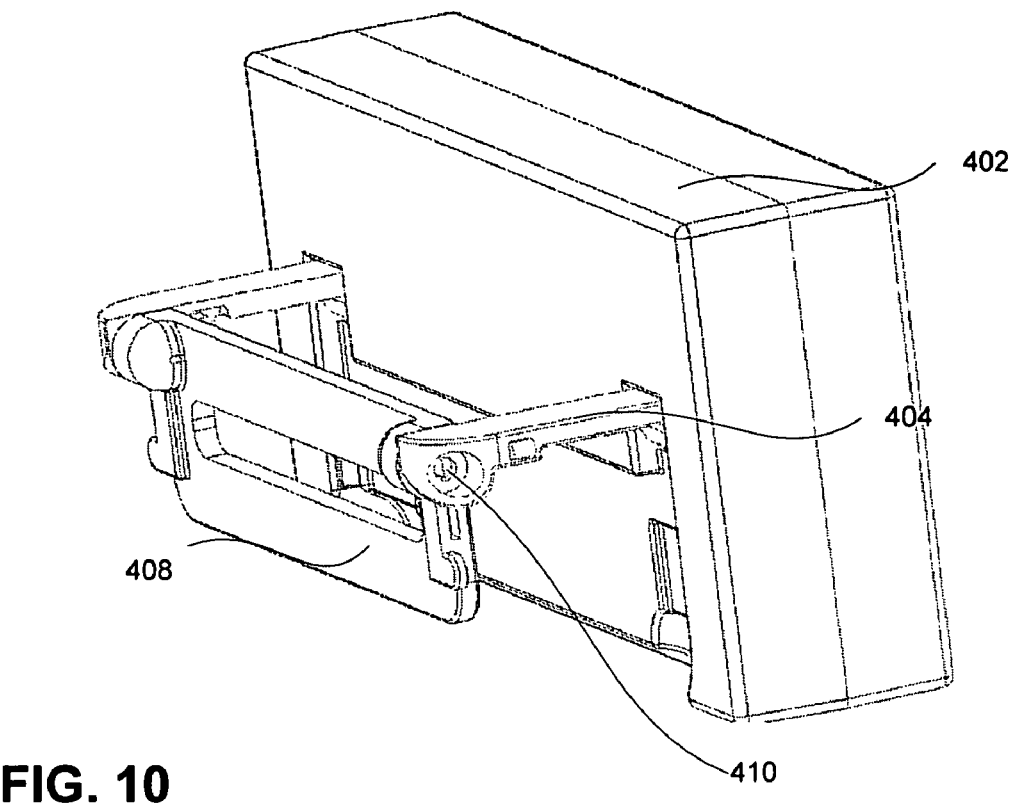
FIG. 10 is a perspective view of a folding extendable arm in an extended position in accordance with one embodiment of the present invention.
Figure 11:
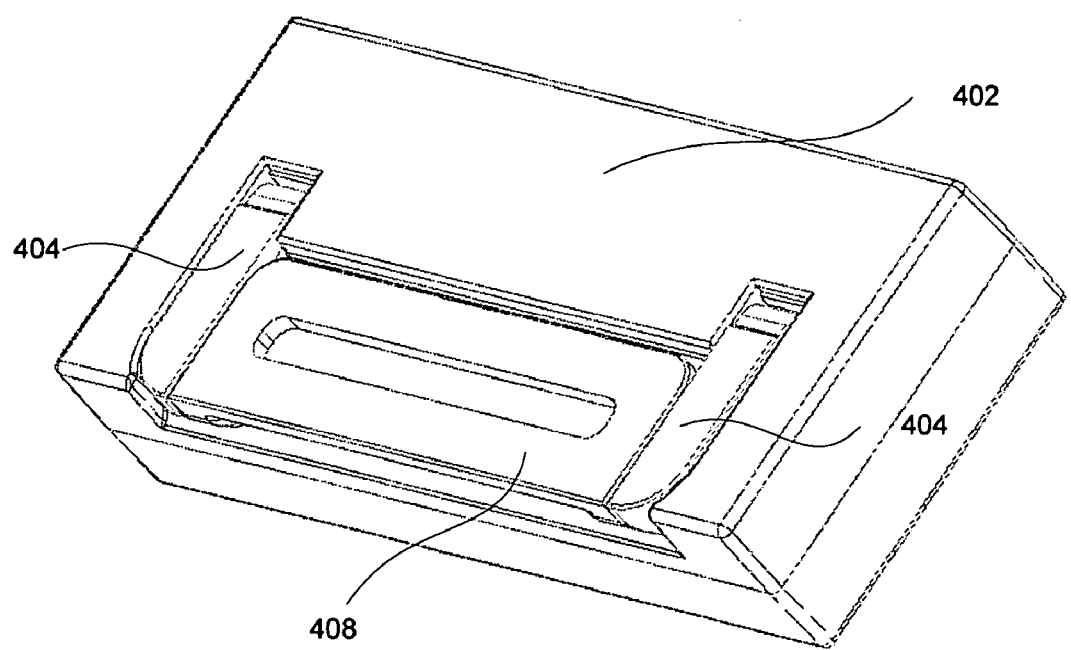
FIG. 11 is a perspective view of a folding extendable arm in a folded position in accordance with one embodiment of the present invention.

FIGS. 10 and 11 illustrate an alternative embodiment for providing a folding extendable arm. FIG. 10 is a perspective view of a folding extendable arm in an extended position in accordance with one embodiment of the present invention. FIG. 11 is a perspective view of a folding extendable arm in a folded (retracted) position in accordance with one embodiment of the present invention. In this embodiment, the mounting plate 408 of the extendable arm 404 is rotatably mounted on the main portion of the extendable arm, in particular, the portion of the main arm distal to the second chamber attachment point. The rotatable mounting is provided by pivot pins 410 preferably integrally formed on the ends of the mounting plate 408. The extendable arm main portion is also pivotally mounted on the second chamber. Thus, the extendable arm, together with its mounting plate 408 may be compactly folded into a recess in the second chamber as illustrated in its folded position in FIG. 11. In the extended position shown in FIG. 10, a hook is formed for mounting the speaker system on the top portion of the laptop screen (not shown). In accordance with one embodiment, spring tension is provided between the mounting plate 408 and the extendable arm main portion such that excessive clearance between the laptop screen and the extendable arm's mounting plate 408 is eliminated. That is, the return force from the spring tension tends to close the mounting plate 408 against the main portion of the extendable arm. The foregoing examples of extendable arms are intended to be illustrative and not limiting. The scope fo the present invention is intended to extend to all configurations having any form of extendable arms adaptable for coupling the second member or enclosure to a portable computer or any other device suitable for mounting the acoustic chamber speakers. Preferably the extendable arm is retractable to a compact shape and more preferably retractable into a recess or cavity formed in the second chamber, but the scope of the invention is not so limited.

The foregoing description describes several techniques for removably coupling the portable speaker system to a laptop screen or other device. Alternatively, the portable speaker system may be electrically connected to the laptop to provide a multimedia experience but mounted independent of the laptop. For example, the speaker system may be freestanding on the same surface as the laptop computer. By configuring the portable speaker system in accordance with the embodiments described, a high quality audio experience can be added to a portable computer using a compact system.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A portable speaker system capable of attachment to a portable computer, the system comprising:
   an acoustic member having a sound reproducing mechanism;
   a second member configured for coupling to the portable computer;
   a damped hinge mechanism movably coupling the acoustic member and the second member; and
   an extendable arm coupled to the second member and configured for removably coupling the second member to the computer.

2. The system as recited in claim 1, wherein the acoustic member is a chamber containing at least one speaker.

3. The system as recited in claim 1, wherein the damped hinge mechanism comprises at least a first and second rotating ring configured to provide rotational movement therebetween and at least one elastic ring positioned between the two rings.

4. The system as recited in claim 1, wherein the damped hinge mechanism comprises two rotating rings, a first of the rotating rings attached to the acoustic chamber and the second rotating ring attached to the second member, the rotating rings configured for rotational movement relative to the first rotating ring.

5. The system as recited in claim 3, wherein the elastic ring composition, diameter and thickness is selected to provide damping in a range suitable for decoupling acoustic induced vibrations from the sound reproducing mechanism to the second member.

6. The system as recited in claim 1, further comprising a spring coupled to the extendable arm.

7. A portable speaker system capable of attachment to a portable computer, the system comprising:
   an acoustic member having a sound reproducing mechanism;
   a second member configured for coupling to the portable computer; and
   a first and second damped hinge mechanism movably coupling the acoustic member and the second member; wherein each of the first and the second damped hinge mechanisms are symmetrically located on opposing ends of the second member.

8. The system as recited in claim 1, wherein the second member comprises a recess for receipt of the extendable arm in a retracted state.

9. The system as recited in claim 1, wherein the extendable arm is configured for retraction in the second member in a first mode and in extension for coupling to the computer in a second mode.

10. The system as recited in claim 9, wherein in the first mode the extendable arm is folded against the surface of the second member.

11. The system as recited in claim 9, wherein the at least one extendable arm is folded into a recess formed in the second member.

12. The system as recited in claim 9, wherein the extendable arm is formed from at least one telescoping rod.

13. The system as recited in claim 1, wherein the extendable arm further comprises a mounting plate configured to contact the front surface of the portable computer display screen, said mounting plate attached at the distal portion of the extendable arm.

14. The system as recited in claim 1, wherein the second member is an enclosure housing at least one electronic circuit.

15. A portable speaker system capable of attachment to a flat panel display of a computer, comprising:
   a first enclosure having a sound reproducing mechanism;
   a second enclosure configured for coupling to the flat panel display of the computer;
   a damped hinge mechanism movably coupling the first enclosure and the second enclosure, wherein the hinge mechanism has damping and compliance selected for maintaining a user adjustable position of the second enclosure relative to the first enclosure; and
   an extendable arm coupled to the second enclosure and configured for removably coupling the second enclosure to the flat panel display of the computer.

16. The speaker system as recited in claim 15 wherein the hinge mechanism is operable to enable the first enclosure to maintain at least two configurations relative to the second enclosure.

17. The speaker system as recited in claim 16 wherein a first of the at least two configurations comprises the first enclosure in line with the second enclosure for mounting the speaker system on the flat panel display and the second of the at least two configurations comprises the plane of the first enclosure substantially perpendicular to the second enclosure for placement of the speaker system on a flat surface.

18. The speaker system as recited in claim 16 wherein a third of the at least two configurations comprises folding the first enclosure flat against the second enclosure.

* * * * *